United States Patent
Martens et al.

(10) Patent No.: US 6,737,631 B2
(45) Date of Patent: May 18, 2004

(54) MOVEMENT DETECTOR WITH TAPERING KALEIDOSCOPIC MIRRORS AND METHOD OF INSTALLING SUCH A DETECTOR

(75) Inventors: Christiaan Jacob Martens, Eindhoven (NL); Hendrik Bijl, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/840,208

(22) Filed: Apr. 23, 2001

(65) Prior Publication Data

US 2002/0005487 A1 Jan. 17, 2002

(30) Foreign Application Priority Data

Apr. 25, 2000 (EP) .............................. 00201482

(51) Int. Cl.⁷ .................. G06M 7/00; G08B 13/08
(52) U.S. Cl. .................. 250/221; 250/216; 340/545.3
(58) Field of Search .................. 250/216, 221; 340/555, 556, 557, 540, 565, 545.3; 359/616

(56) References Cited

U.S. PATENT DOCUMENTS 3,809,879 A * 5/1974 Gonzalez ................ 359/617
3,864,566 A * 2/1975 Simpson et al. ........... 250/216
3,923,382 A * 12/1975 Harding ...................... 350/296
4,087,688 A * 5/1978 Keller ......................... 250/342
4,155,066 A * 5/1979 Galvin et al. ............... 367/140
4,172,629 A   10/1979 Allen ........................... 350/4.1
5,103,346 A * 4/1992 Chang ......................... 359/855
5,717,203 A * 2/1998 Yung ........................... 250/221
6,031,456 A * 2/2000 Hanyuda .................... 340/555

OTHER PUBLICATIONS

Karadimos, Charles "Kaleidoscope Mirror Arrangements". On–line, internet: www.brewstersociety.com/mirror_config.html.*

* cited by examiner

Primary Examiner—Stephone B. Allen
(74) Attorney, Agent, or Firm—Ernestine C. Bartlett

(57) ABSTRACT

A movement detector for detecting movement of a body includes a light sensor, a kaleidoscopic mirror and a lens for projecting a multiple image of the space onto the sensor. The movement detector is very sensitive and has a very small diameter.

7 Claims, 3 Drawing Sheets

MOVEMENT DETECTOR WITH TAPERING KALEIDOSCOPIC MIRRORS AND METHOD OF INSTALLING SUCH A DETECTOR

BACKGROUND OF THE INVENTION

The invention relates to a movement detector which is capable of detecting movement of a body, for example a human, in a space and includes a light-sensitive sensor and optical means which are capable of projecting a multiple image of the space onto the sensor.

A movement detector of this kind is known. The optical means in the known detector consists of a plurality of lenses, usually in the form of a multi-faceted lens. The sensor, usually being a passive infrared (PIR) sensor, is arranged, for example, over an opening in a ceiling while the lenses are situated underneath the opening in the ceiling. Each of the lenses projects an image of the space situated therebelow onto the sensor. When a person moves in the space, the (infrared) light intensity projected onto the sensor by the lenses will exhibit fluctuations that can be detected by means of the electronic circuitry coupled to the sensor so that, for example, an alarm can be triggered.

It is a drawback of the known movement detector that the lenses that are fitted underneath the ceiling must have a given cross-section and hence occupy a comparatively large surface area of a diameter of a few centimeters, so that the movement detector can be easily discovered by an unwanted person, such as a burglar. Moreover, such a comparatively large detector is experienced as a displeasing element on the ceiling.

The more accurate the detector must be, the more images of the space must in principle be projected onto the sensor, and hence the more lenses are required. Furthermore, the assembly of lenses should be constructed in such a manner that each individual lens is focused onto the sensor element for the detection distance applicable to this individual lens. This makes it practically impossible to vary the distance between the lens assembly and the sensor.

OBJECTS AND SUMMARY OF THE INVENTION

It is an object of the invention to provide a simple, inexpensive, sensitive and reliable motion detector that can be used in a variety of ways and can be installed in a space in such a manner that it is less conspicuous.

To this end, the optical means include a mirror assembly having a kaleidoscopic effect. Because of the kaleidoscopic effect, the space is imaged onto the sensor in multiple form and, when the mirror assembly forms a closed circumference, in principle in an infinite multiple, so that a very accurate sensor can be realized. The movement detector can be arranged in the ceiling in such a manner that only the mirror assembly projects from the ceiling. The cross-section of this mirror assembly need only amount to a few millimeters, so that the detector can hardly be noticed. The mirror assembly preferably constitutes an elongate body whose reflecting surface faces inwards. This body may be hollow and be formed by mirrors; it may also be formed by a solid body that is transparent to the relevant light, for example a glass body whose side faces constitute inwards facing mirrors, either by interface reflection or by way of an externally deposited mirror layer. An assembly of mirrors having a kaleidoscopic effect is known per se and described, for example in the patent documents GB-A-2 228 098 and JP-A-7 236 775.

In order to enhance appropriate operation of the movement detector it is necessary to image the space actually on the sensor. To this end, the optical means preferably also include a lens. The sensor is then preferably situated near a first end of the mirror assembly whereas the lens is preferably situated near the second, opposite end of the mirror assembly.

It is known per se that a kaleidoscopic effect can be obtained by making the cross-section of an assembly of mirrors form a polygon. In the simplest but efficient implementation the cross-section of the mirror assembly is shaped essentially as a triangle, that is, preferably an isosceles triangle.

The cross-section of the mirror assembly in a simple but effective embodiment is essentially the same along its entire longitudinal axis. However, if a larger or a smaller part of the space is to be imaged onto the sensor, it may be advantageous to make the cross-section of the mirror assembly vary along its longitudinal axis as from the sensor, that is, from a smallest to a largest cross-section or from a largest to a smallest cross-section. A "wide angle" effect and a "tele-effect", respectively, are thus achieved.

The sensor preferably includes an infrared sensor which is, for example, sensitive to light of a wavelength in the range of from 3 to 10 µm.

The invention also relates to a method of installing a movement detector in a space in order to detect movement of a body in the space, a light-sensitive sensor being arranged above a ceiling of the space while optical means which include a mirror assembly having a kaleidoscopic effect are arranged in such a manner that they project a multiple image of the space onto the sensor, the arrangement being such that the mirror assembly extends essentially through the ceiling.

BRIEF DESCRIPTION OF THE DRAWING

The invention will be described in detail hereinafter with reference to the embodiments shown in the Figures; wherein.

DESCRIPTION OF THE PREFERRED EMBODIMENTS

Figure 1:
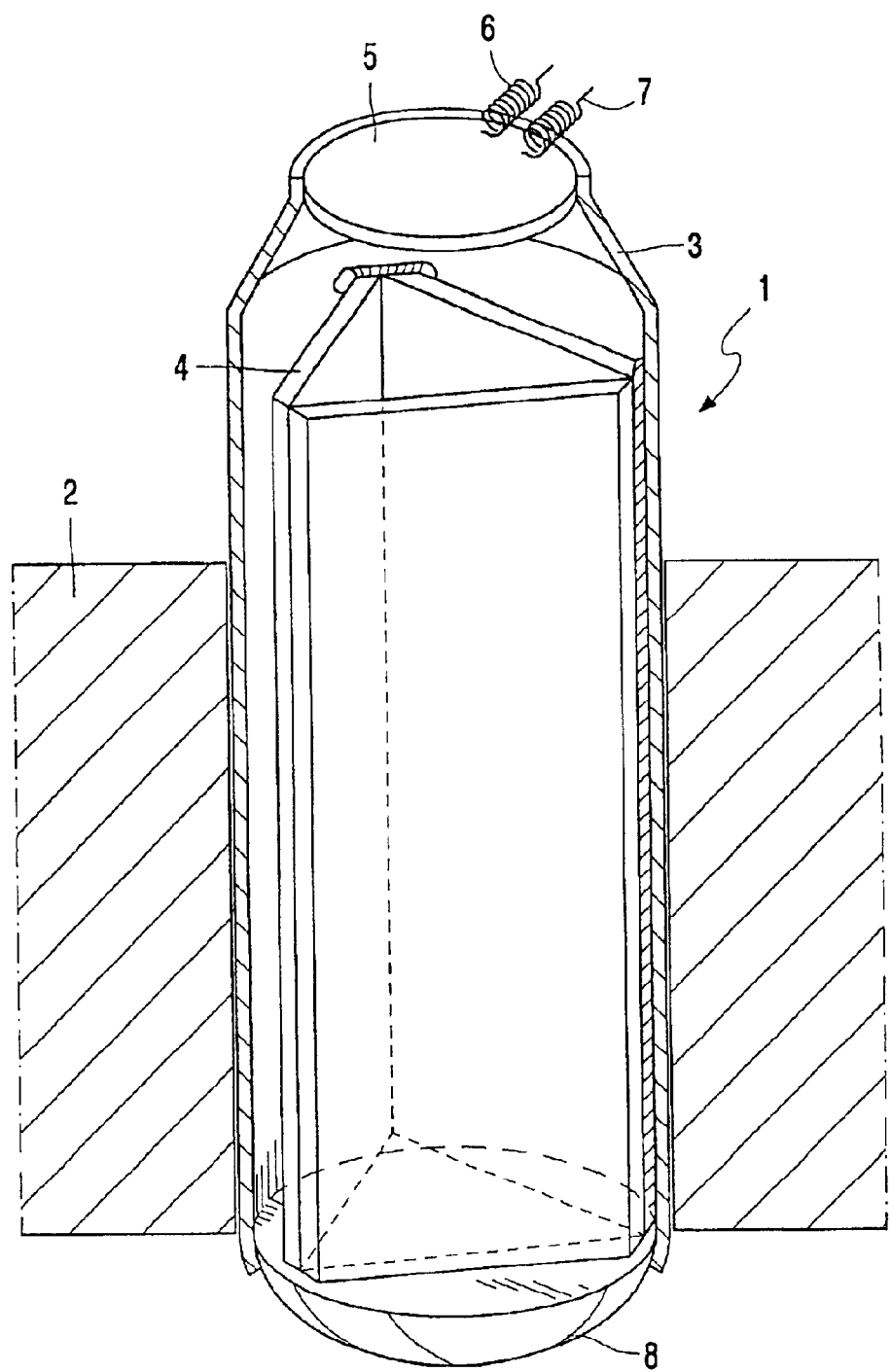
FIG. 1 is a partly cut-away perspective view of an embodiment of a movement detector.

FIG. 1 shows a movement detector 1 which is mounted in a ceiling of a space, said ceiling being only schematically indicated. The movement detector 1 includes a housing 3 which accommodates a mirror assembly 4. The mirror assembly 4 consists of three elongate, rectangular mirrors which are arranged so that the reflecting sides face inwards and form a triangle, thus constituting sides of a prismatic body. The mirror assembly 4 has a kaleidoscopic effect because of this shape. It is known that polygonal shapes also have a kaleidoscopic effect, so that a prismatic shape with a quadrangular, a pentagonal or a polygonal cross-section also belongs to the possibilities.

The movement detector is also provided with a sensor 5 which is arranged at the upper side and is sensitive to infrared light of a wavelength of between approximately 3 and 10 µm. The sensor 5 may be, for example, a pyro-electrical, quantum mechanical or other known sensor.

When infrared light is incident on the sensor, that is thermal radiation emitted by, for example a human present in the space below the ceiling 2, an electric voltage is generated in the electrically conductive wires 6, 7, which voltage is higher as the radiation intensity on the sensor 5 is higher.

At the lower side of the detector 1 there is fitted an optical lens which images the space below the ceiling 2 onto the sensor 5. The operation of the movement detector is as follows. Because of the kaleidoscopic effect of the mirror assembly 4, a multiple image of the space is projected onto the sensor 5, that is, as if there were a plurality of different lenses 8, each of which was aimed at a different part of the space. Should a heat emissive body, for example a human, move in the space, the light intensity incident on the sensor 5 will vary; this variation can be detected and analyzed by an electronic device whereto the wires 6, 7 are connected as is customary in movement detectors. The electronic device can trigger, for example an alarm or switch on the lighting in the space.

Figure 2:
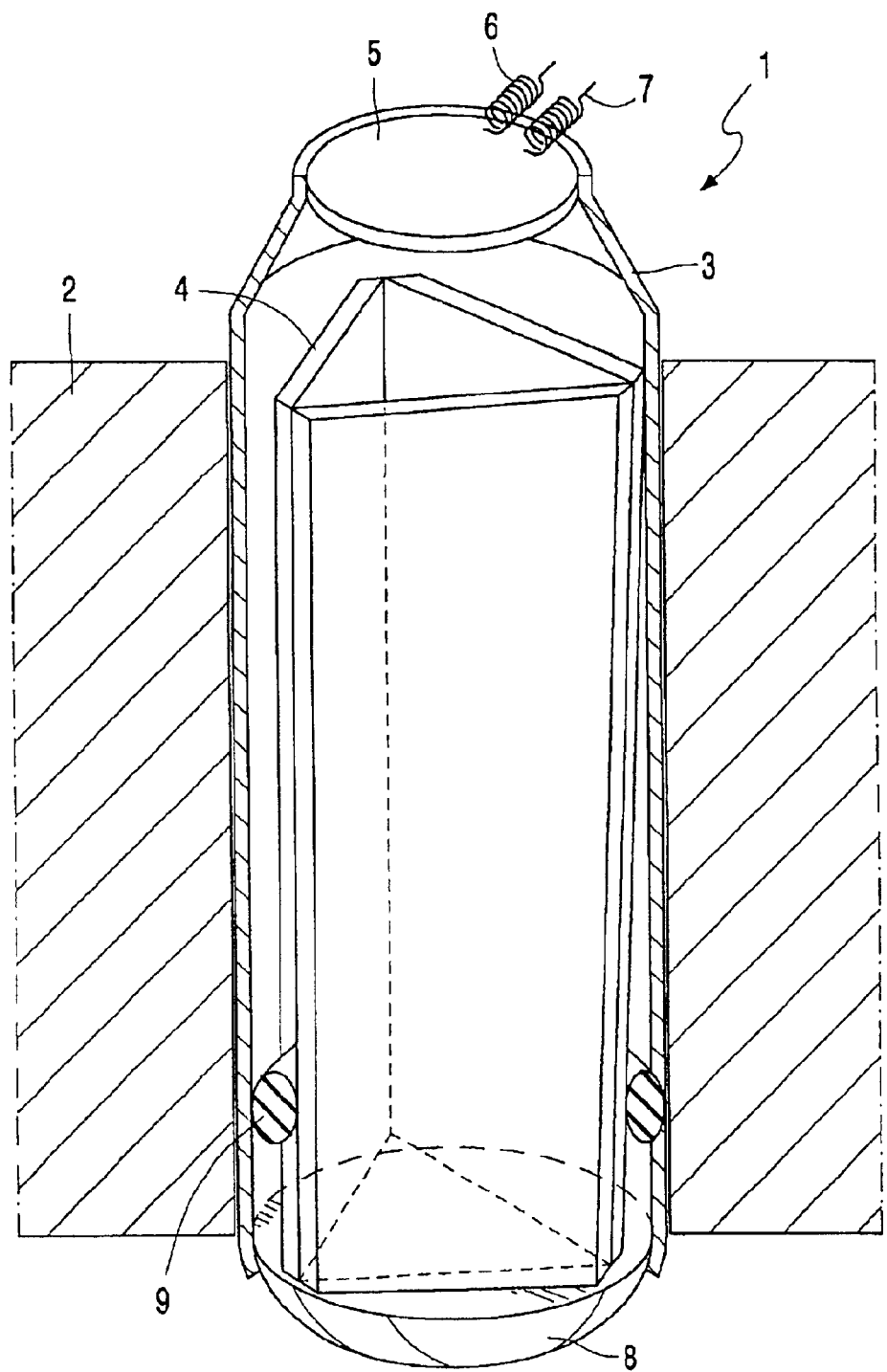
FIG. 2 is a partly cut-away perspective view of another embodiment of a movement detector.

FIG. 2 shows a mirror assembly which has a cross-section that is slightly larger at the top than at the bottom. The mirrors of the assembly 4 are shaped as a trapezium for this purpose. As a result, a larger part of the space can be imaged on the sensor 5. In other words, such an assembly 4 has a "wide angle" effect. For example, a rubber ring 9 can be used to secure the tapered assembly 4 in the housing 3.

Figure 3:
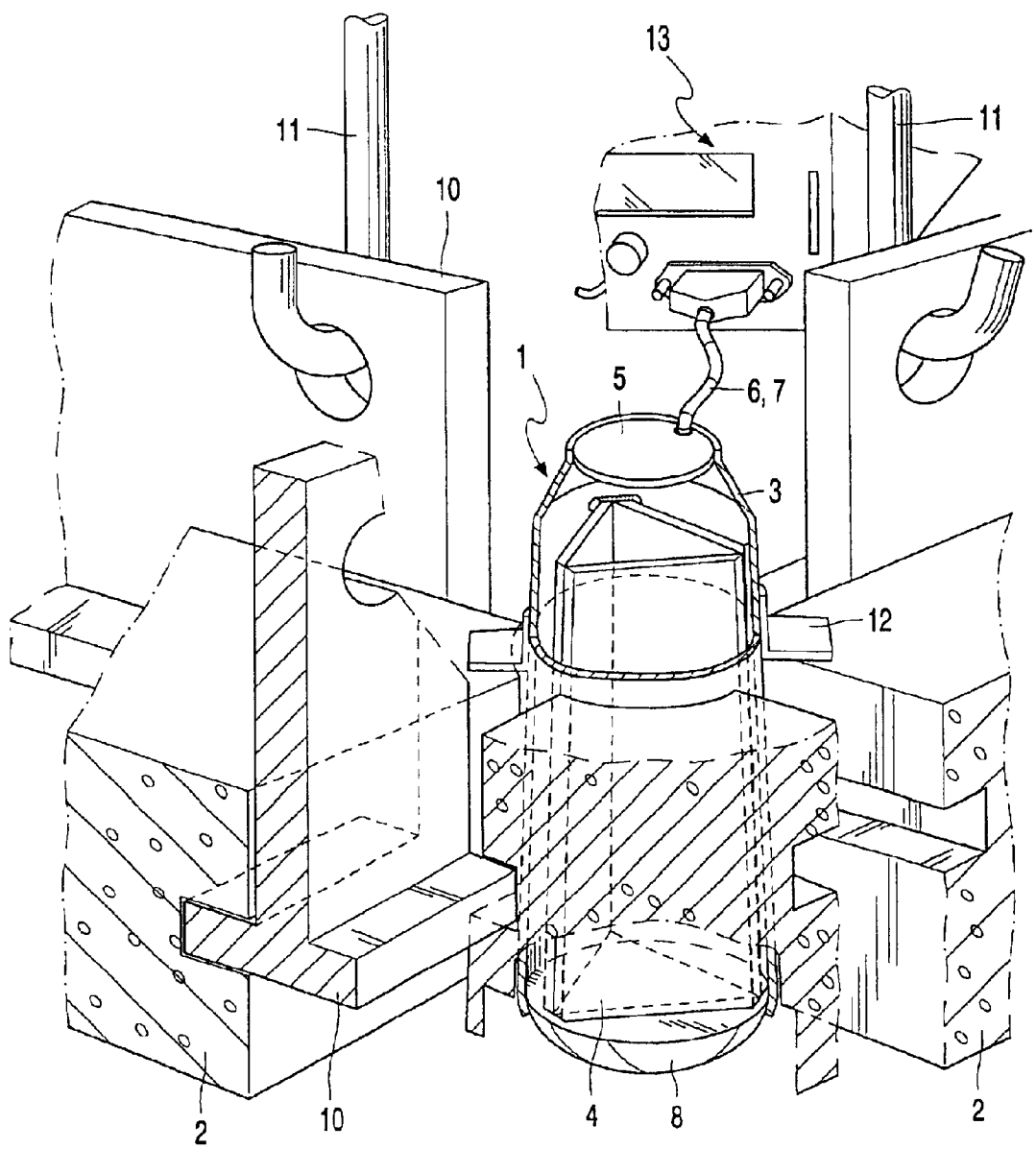
FIG. 3 is a partly cut-away perspective view of another embodiment yet of a ceiling-mounted movement detector.

FIG. 3 shows a mirror assembly 4 whose cross-section at the top is slightly smaller than that at the bottom, so that the assembly 4 has a "tele-effect". The detection range in the space, therefore, is concentrated in a limited part thereof.

FIG. 3 also shows in detail how the detector 1 can be fitted in a ceiling 2. In the present example the detector 1 is arranged at the intersection of two profiles 10 which are suspended, for example, by means of hooks 11, from the floor situated thereabove. Ceiling plates are fitted in the profiles 10, an opening being formed for the detector 1 at the intersection. This detector can rest on the plates by way of brackets 12. The detector can also be simply fitted in one of the ceiling plates. FIG. 3 also shows a part of an electronic device 13 whereto the detector 1 is connected by way of the wires 6, 7 and which processes the voltage signal output by the detector. The electronic device 13 may also be incorporated in the movement detector 1.

What is claimed is:

1. A movement detector which is capable of detecting movement of a body in a space and includes a light-sensitive sensor and optical means which are capable of projecting a multiple image of the space onto the sensor, the optical means including a mirror assembly, the mirror assembly constituting an elongate body whose reflecting surface faces inwards, the mirror assembly having a kaleidoscopic effect, characterized in that the cross-section of the mirror assembly varies from a smallest to a largest cross-section along its longitudinal axis.

2. A movement detector as claimed in claim 1, characterized in that the sensor includes an infrared sensor.

3. A movement detector as claimed in claim 1, characterized in that the optical means include a lens.

4. A movement detector as claimed in claim 3, characterized in that the sensor is situated near a first end of the mirror assembly whereas the lens is situated near the second end of the mirror assembly.

5. A movement detector as claimed in claim 1, characterized in that the cross-section of the mirror assembly forms a polygon.

6. A movement detector as claimed in claim 5, characterized in that the polygon is essentially a triangle.

7. A method of installing a movement detector in a ceiling in order to detect movement of a body in the space below the ceiling, the movement detector comprising a light-sensitive sensor and optical means, the optical means including a mirror assembly having a kaleidoscopic effect, the method comprising:

arranging the movement detector such that the light-sensitive sensor is positioned above the ceiling while the optical means are positioned such that the mirror assembly extends essentially through the ceiling, whereby the optical means projects a multiple image of the space onto the sensor.

* * * * *